US 6,594,844 B2
Jul. 22, 2003

(12) United States Patent
Jones

(10) Patent No.: US 6,594,844 B2
(45) Date of Patent: Jul. 22, 2003

(54) ROBOT OBSTACLE DETECTION SYSTEM

(75) Inventor: Joseph L. Jones, Acton, MA (US)

(73) Assignee: iRobot Corporation, Burlington, MA (US)

( * ) Notice: Subject to any disclaimer, the term of this patent is extended or adjusted under 35 U.S.C. 154(b) by 220 days.

(21) Appl. No.: 09/768,773

(22) Filed: Jan. 24, 2001

(65) Prior Publication Data

US 2002/0016649 A1 Feb. 7, 2002

Related U.S. Application Data

(60) Provisional application No. 60/177,703, filed on Jan. 24, 2000.

(51) Int. Cl.$^7$ .............................. A47L 5/00; A47L 9/28; A47L 11/00
(52) U.S. Cl. ..................... 15/49.1; 15/319; 250/559.33; 901/47
(58) Field of Search ..................... 15/49.1, 50.1–50.3, 15/52.1, 98, 319, 340.1, 340.3, 340.4; 250/559.31, 559.33; 102/213; 901/47

(56) References Cited

U.S. PATENT DOCUMENTS

| 4,556,313 A | * | 12/1985 | Miller et al. |
| 4,887,415 A | * | 12/1989 | Martin |
| 4,893,025 A | * | 1/1990 | Lee |
| 5,002,145 A | * | 3/1991 | Waqkaumi et al. |
| 5,142,985 A | * | 9/1992 | Stearns et al. |
| 5,208,521 A | * | 5/1993 | Aoyama |
| 5,279,672 A | * | 1/1994 | Betker, Jr. et al. |
| 5,284,522 A | * | 2/1994 | Kobayashi et al. |
| 5,446,356 A | * | 8/1995 | Kim |
| 5,568,589 A | | 10/1996 | Hwang |
| 5,613,261 A | | 3/1997 | Kawakami et al. |
| 5,652,489 A | * | 7/1997 | Kawakami |
| 5,787,545 A | * | 8/1998 | Colens |
| 5,812,267 A | * | 9/1998 | Everett, Jr. et al. |
| 5,815,880 A | * | 10/1998 | Nakanishi |
| 6,038,501 A | | 3/2000 | Kawakami |
| 6,076,025 A | | 6/2000 | Ueno et al. |
| 6,076,226 A | * | 6/2000 | Reed |
| 6,226,830 B1 | * | 5/2001 | Hendriks et al. |

FOREIGN PATENT DOCUMENTS

WO    PCT/US99/16078    7/1999

* cited by examiner

Primary Examiner—Terrence R. Till
(74) Attorney, Agent, or Firm—Iandiorio & Teska

(57) ABSTRACT

A robot obstacle detection system including a robot housing which navigates with respect to a surface and a sensor subsystem having a defined relationship with respect to the housing and aimed at the surface for detecting the surface. The sensor subsystem includes an optical emitter which emits a directed beam having a defined field of emission and a photon detector having a defined field of view which intersects the field of emission of the emitter at a region. A circuit in communication with a detector redirects the robot when the surface does not occupy the region to avoid obstacles. A similar system is employed to detect walls.

20 Claims, 19 Drawing Sheets

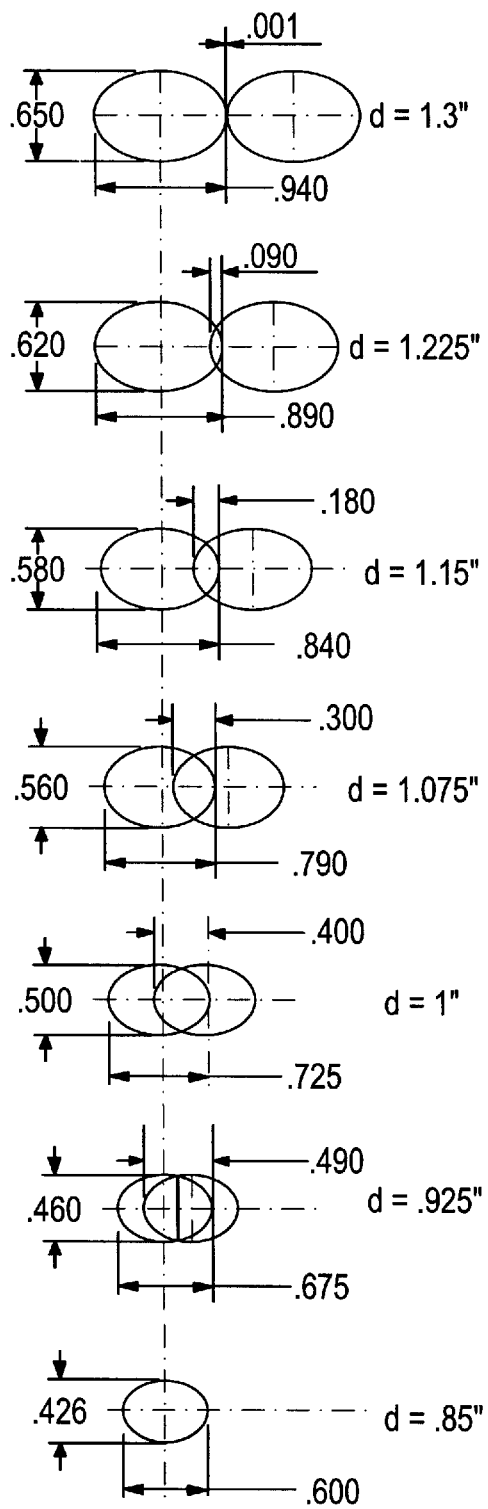
*FIG. 12*  *FIG. 11*

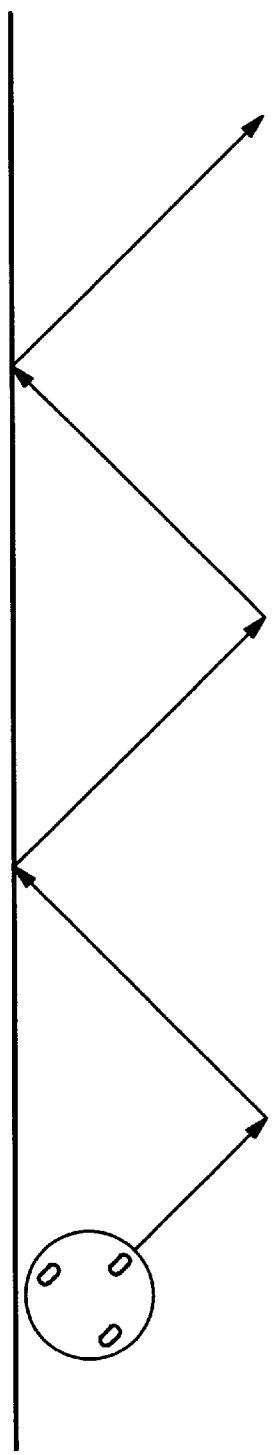
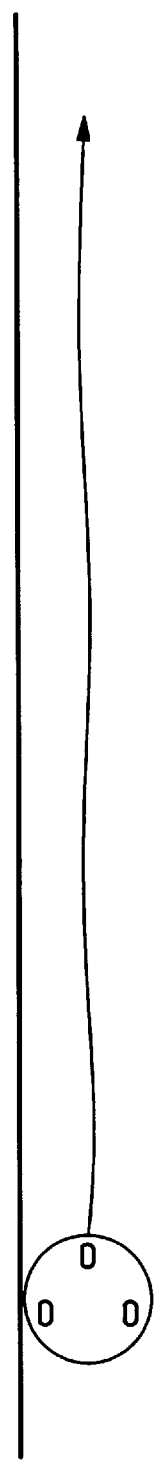
FIG. 20  FIG. 21

ROBOT OBSTACLE DETECTION SYSTEM

PRIORITY CLAIM

This invention claims priority from Provisional Application Ser. No. 60/177,703 filed Jan. 24, 2000.

FIELD OF THE INVENTION

This invention relates to an obstacle detection system for an autonomous cleaning robot.

BACKGROUND OF THE INVENTION

There is a long felt need for autonomous robotic cleaning devices for dusting, mopping, vacuuming, and sweeping operations. Although technology exists for complex robots which can, to some extent, "see" and "feel" their surroundings, the complexity, expense and power requirements associated with these types of robotic subsystems render them unsuitable for the consumer marketplace.

The assignee of the subject application has devised a less expensive, battery operated, autonomous cleaning robot which operates in two modes: random and wall following. In the random bounce mode, the processing circuitry of the robot causes it to move in a straight line until the robot comes into contact with an obstacle; the robot then turns away from the obstacle and heads in a random direction. In the wall following mode, the robot encounters a wall, follows it for a time, and then returns to the random mode. By using this combination of modes, robotic theory has proven that the floor including the edges thereof is adequately covered in an optimal time resulting in a power savings.

Unfortunately, however, presently available sensor subsystems such as sonar sensors for detecting obstacles on or in the floor or for detecting the wall in order to enter the wall following mode (or to avoid bumping into the wall) are either too complex or too expensive of both. Tactile sensors are inefficient.

SUMMARY OF THE INVENTION

It is therefore an object of this invention to provide a robot obstacle detection system which is simple in design, low cost, accurate, easy to implement, and easy to calibrate.

It is a further object of this invention to provide such a robot detection system which prevents an autonomous cleaning robot from driving off a stair or over an obstacle which is too high or too low.

It is a further object of this invention to provide a robotic wall detection system which is low cost, accurate, easy to implement and easy to calibrate.

It is a further object of this invention to provide such a robot wall detection system which effects smoother robot operation in the wall following mode.

It is a further object of this invention to provide a sensor subsystem for a robot which consumes a minimal amount of power.

It is a further object of this invention to provide a sensor subsystem which is unaffected by surfaces of different reflectivity.

The invention results from the realization that a low cost, accurate, and easy to implement system for either preventing an autonomous cleaning robot from driving off a stair or over an obstacle which is too high or too low and/or for more smoothly causing the robot to follow a wall for more thorough cleaning can be effected by intersecting the field of view of a detector with the field of emission of a directed beam at a predetermined region and then detecting whether the floor or wall occupies that region. If the floor does not occupy the predefined region, a stair or some other obstacle is present and the robot is directed away accordingly. If a wall occupies the region, the robot is first turned away from the wall and then turned back towards the wall at decreasing radiuses of curvature until the wall once again occupies the region of intersection to effect smoother robot operation in the wall following mode.

This invention features an autonomous robot comprising a housing which navigates in at least one direction on a surface. A first sensor subsystem is aimed at the surface for detecting obstacles on the surface. A second sensor subsystem is aimed at least proximate the direction of navigation for detecting walls. Each subsystem includes an optical emitter which emits a directed beam having a defined field of emission and a photon detector having a defined field of view which intersects the field of emission of the emitter at a finite, predetermined region.

The robot obstacle detection system of this invention features a robot housing which navigates with respect to a surface and a sensor subsystem having a defined relationship with respect to the housing and aimed at the surface for detecting the surface. The sensor subsystem includes an optical emitter which emits a directed beam having a defined field of emission and a photon detector having a defined field of view which intersects the field of emission of the emitter at a region. A circuit in communication with the detector then redirects the robot when the surface does not occupy the region to avoid obstacles.

Typically, there are a plurality of sensor subsystems spaced from each other on the housing of the robot and the circuit includes logic for detecting whether any detector has failed to detect a beam from an emitter.

In one embodiment, the robot includes a surface cleaning brush. The emitter typically includes an infrared light source and the detector then includes an infrared photon detector. A modulator connected to the infrared light source modulates the directed infrared light source beam at a predetermined frequency and photon detector is tuned to that frequency. The emitter usually includes an emitter collimator about the infrared light source for directing the beam and the detector then further includes a detector collimator about the infrared photon detector. The emitter collimator and the detector collimator are preferably angled with respect to the surface to define a finite region of intersection.

The robot wall detection system of this invention includes a robot housing which navigates with respect to a wall and a sensor subsystem having a defined relationship with respect to the housing and aimed at the wall for detecting the presence of the wall. The sensor subsystem includes an emitter which emits a directed beam having a defined field of emission and a detector having a defined field of view which intersects the field of emission of the emitter at a region. A circuit in communication with the detector redirects the robot when the wall occupies the region.

In the preferred embodiment, there are a plurality of sensor subsystems spaced from each other on the housing of the robot and the circuit includes logic for detecting whether any detector has detected a beam from an emitter.

The circuit includes logic which redirects the robot away from the wall when the wall occupies the region and back towards the wall when the wall no longer occupies the region of intersection preferably at decreasing radiuses of curvature until the wall once again occupies the region of intersection to effect smooth operation of the robot in the wall following mode.

The sensor subsystem for an autonomous robot which rides on a surface in accordance with this invention includes an optical emitter which emits a directed optical beam having a defined field of emission, a photon detector having a defined field of view which intersects the field of emission of the emitter at a region and a circuit in communication with a detector for providing an output when an object is not present in the region.

If the object is the surface, the output from the circuit causes the robot to be directed to avoid an obstacle. If, on the other hand, the object is a wall, the output from the circuit causes the robot to be directed back towards the wall.

BRIEF DESCRIPTION OF THE DRAWINGS

Other objects, features and advantages will occur to those skilled in the art from the following description of a preferred embodiment and the accompanying drawings, in which:

FIG. 11 is a series of views showing, from top to bottom, no overlap between the field of emission and the field of view and then a full overlap of the field of view over the field of emission;

FIG. 12 is a set of figures corresponding to FIG. 11 depicting the area of overlap for each of these situations shown in FIG. 11;

FIG. 20 is a schematic top view showing the abrupt turns made by a robot in the wall following mode when the wall following algorithm of the subject invention is not employed;

FIG. 21 is a view similar to FIG. 20 except that now the wall following algorithm of the subject invention is employed to smooth out the path of the robotic cleaning device in the wall following mode;

DISCLOSURE OF THE PREFERRED EMBODIMENT

Figure 1:
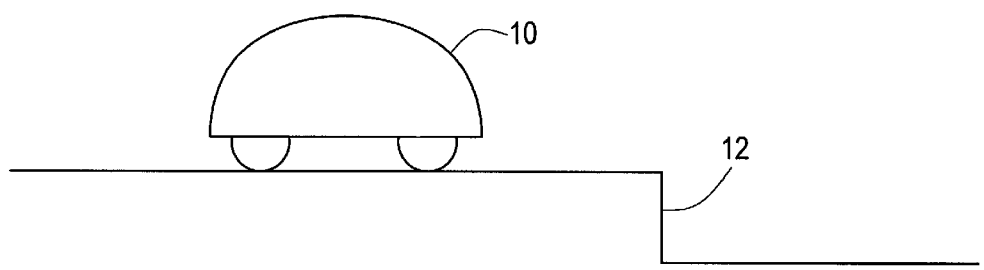
FIG. 1 is schematic view of a robot in accordance with the subject invention approaching a downward stair.
Figure 2:
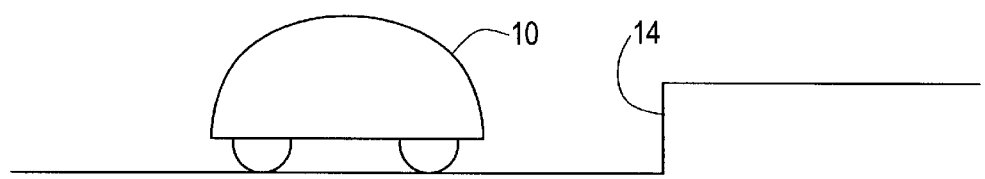
FIG. 2 is a schematic view of the same robot approaching an upward stair.
Figure 3:
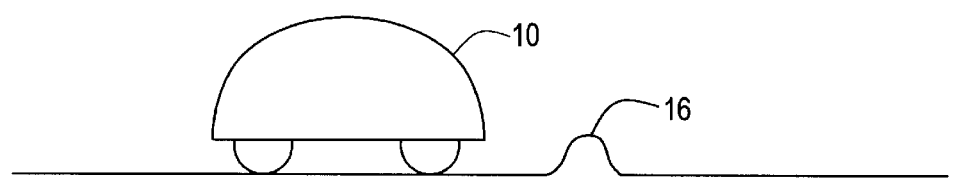
FIG. 3 is a schematic view of the same robot approaching an obstacle on a floor.

Robotic cleaning device 10, FIG. 1 can be configured to dust, mop, vacuum, and/or sweep a surface such as a floor. Typically, robot 10 operates in two modes: random coverage and a wall following mode as discussed in the Background section above. In either mode, robot 10 may encounter downward stair 12 or another similar "cliff", upward stair 14, FIG. 2 or another similar rise, and/or obstacle 16, FIG. 3. According to one specification, the robot must be capable of traversing obstacles less then 5/8" high or low. Therefore, robot 10 must avoid stairs 12 and 14 but traverse obstacle 16 which may be an extension cord, the interface between a rug and hard flooring, or a threshold between rooms.

Figure 4:
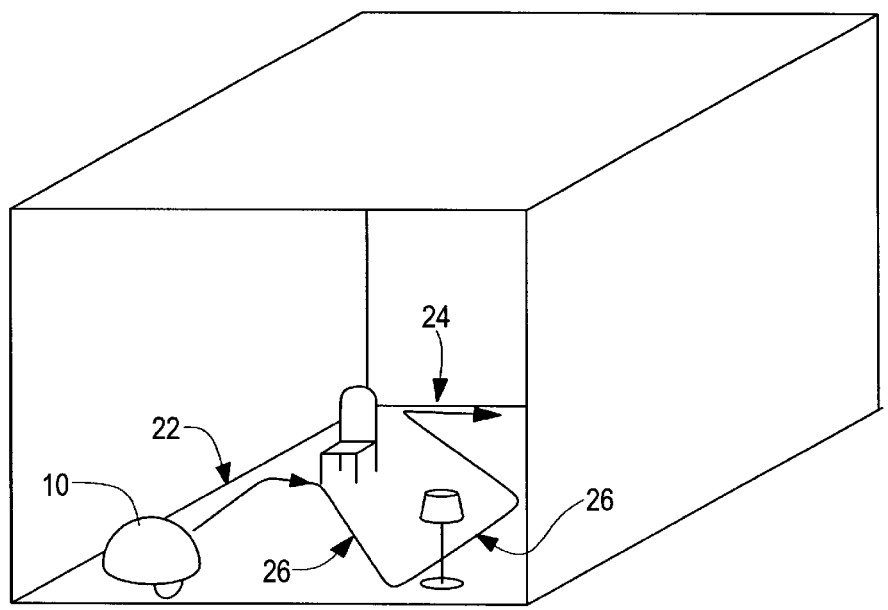
FIG. 4 is a schematic view showing the difference between the wall following and random modes of travel of a robot in accordance with the subject invention.

As delineated in the background of the invention, presently available obstacle sensor subsystems useful in connection with robot 10 are either too complex or too expensive or both. Moreover, robot 10, FIG. 4 is designed to be inexpensive and to operate based on battery power to thus thoroughly clean room 20 in two modes: a wall following mode as shown at 22 and 24 and a random bounce mode as shown at 26. In the wall following mode, the robot follows the wall for a time. In the random bounce mode, the robot travels in a straight line until it bumps into an object. It then turns away from the obstacle by a random turn and then continues along in a straight line until the next object is encountered.

Accordingly, any obstacle sensor subsystem must be inexpensive, simple in design, reliable, must not consume too much power, and must avoid certain obstacles but properly recognize and traverse obstacles which do not pose a threat to the operation of the robot.

Although the following disclosure relates to cleaning robots, the invention hereof is not limited to such devices and may be useful in other devices or systems wherein one or more of the design criteria listed above are important.

Figure 5:
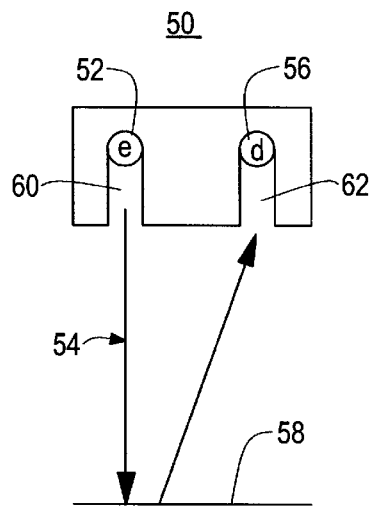
FIG. 5 is a schematic view of a sensor subsystem in accordance with one embodiment of the subject invention.

In the simplest embodiment, sensor subsystem 50, FIG. 5 according to this invention includes optical emitter 52 which emits a directed beam 54 having a defined field of emission explained supra. Sensor subsystem 50 also includes photon detector 56 having a defined field of view which intersects the field of emission of emitter 52 at or for a given region. Surface 58 may be a floor or a wall depending on the arrangement of sensor subsystem 50 with respect to the housing of the robot.

In general, for obstacle avoidance, circuitry is added to the robot and connected to detector 56 to redirect the robot when surface 58 does not occupy the region defining the intersection of the field of emission of emitter 52 and the field of view of detector 56. For wall following, the circuitry redirects the robot when the wall occupies the region defined by the intersection of the field of emission of emitter 52 and the field of view of detector 56. Emitter collimator tube 60 forms directed beam 54 with a predefined field of emission and detector collimator tube 62 defines the field of view of the detector 56.

One potential problem with the configuration shown in FIG. 5 is that the difference between a white or highly reflective surface a long distance away from subsystem 50 and a black or non-reflective surface closer to subsystem 50 cannot be easily detected by the control circuitry. Moreover, the effects of specular scattering are not always easily compensated for adequately when the beam from emitter 52 is directed normal to the plane of surface 58.

Figure 6:
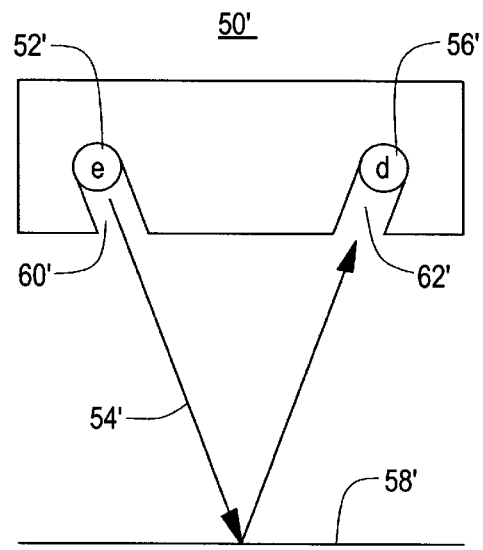
FIG. 6 is a schematic view of a sensor subsystem in accordance with another, preferred embodiment of the subject invention.
Figure 7:
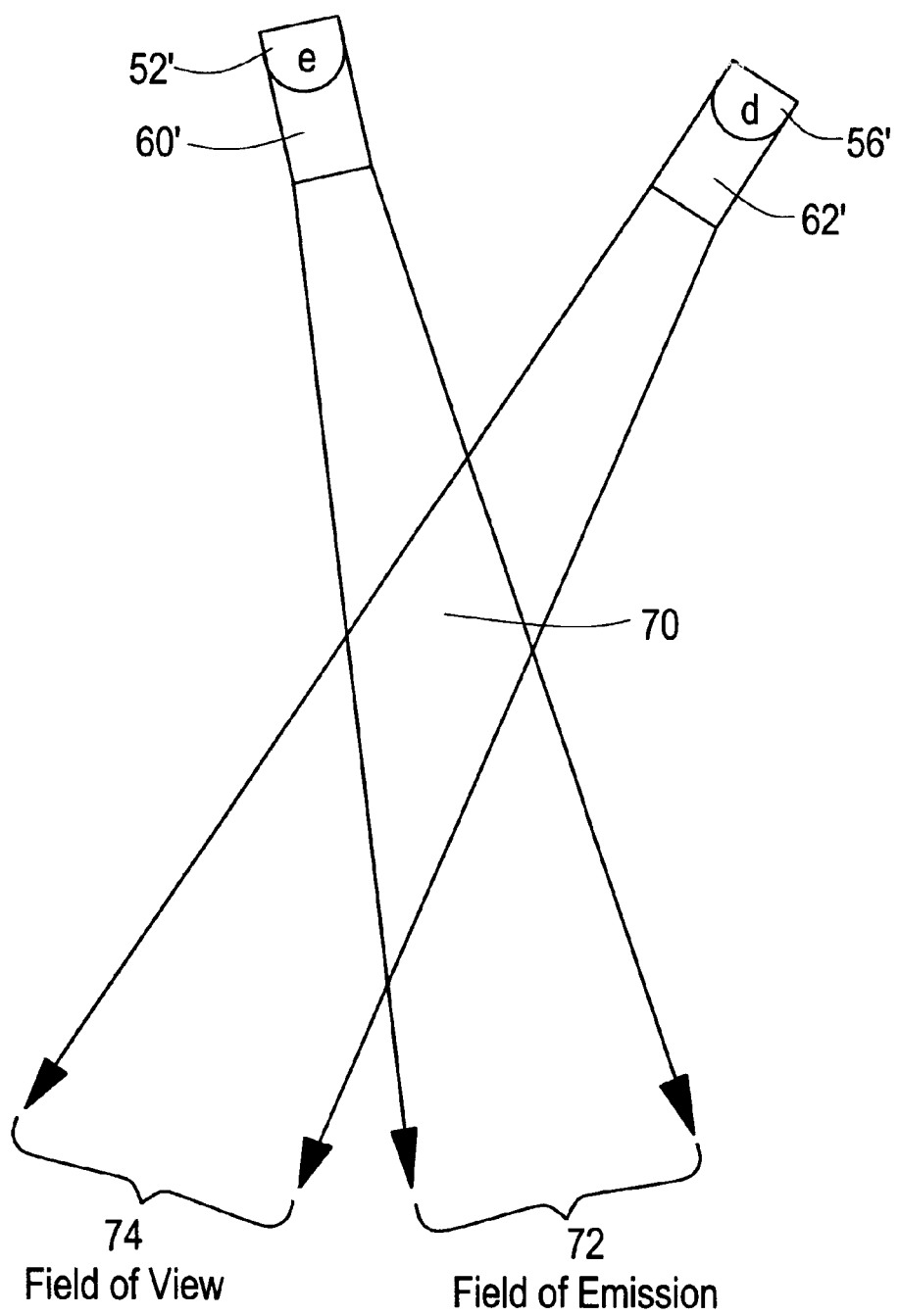
FIG. 7 is a schematic view showing the field of emission of the emitter and the field of view of the detector of the sensor subsystem shown in FIG. 6.

Accordingly, in the preferred embodiment, emitter collimator 60', FIG. 6 and detector collimator 62' are both angled with respect to surface 58 and with respect to each other as shown. In this way, the region 70, FIG. 7 in which the field of emission of emitter 52' as shown at 72 and the field of view of detector of 56' as shown at 74 intersect is finite to more adequately address specular scattering and surfaces of different reflectivity. In this design, the emitter is typically an infrared emitter and the detector is typically an infrared radiation detector. The infrared energy directed at the floor decreases rapidly as the sensor-to-floor distance increases while the infrared energy received by the detector changes linearly with surface reflectivity.

Figure 8:
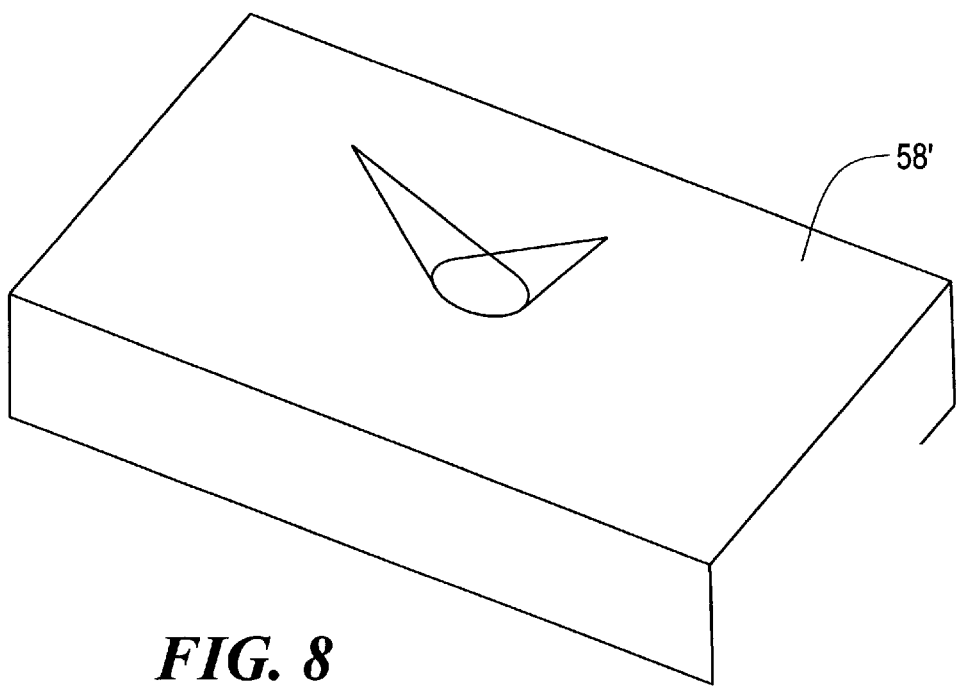
FIG. 8 is a three dimensional schematic view showing a fall overlap of the field of emission of the emitter and the field of view of the detector in accordance with the subject invention.
Figure 9:
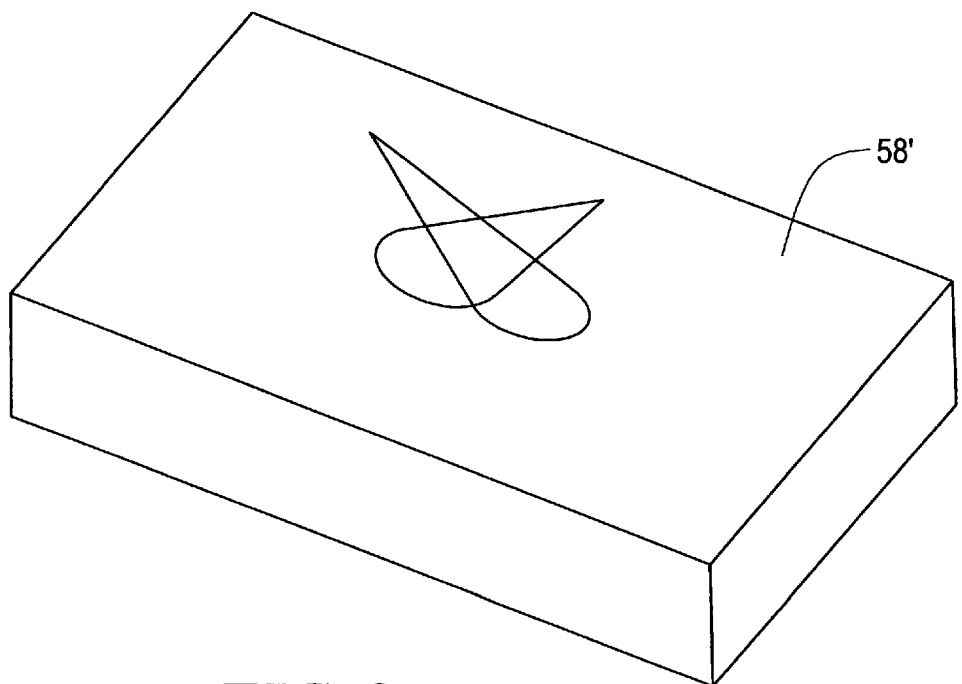
FIG. 9 is a three dimensional schematic view showing the situation which occurs when there is a minimal overlap between the field of emission and the field of view of the sensor subsystem of the subject invention.

The sensor subsystem is calibrated such that when floor or surface 58', FIG. 8 is the "normal" or expected distance with respect to the robot, there is a full or a nearly full overlap between the field of emission of the emitter and the field of view of the detector as shown. When the floor or surface is too far away such that the robot can not successfully traverse an obstacle, there is no or only a minimal overlap between the field of emission of the emitter and the field of view of the detector as shown in FIG. 9. The emitter beam and the detector field of view are collimated such that they fully overlap only in a small region at the expected position of the floor. The detector threshold is then set so that the darkest available floor material is detected when the beam and the field of view fully overlap. As the robot approaches a cliff, the overlap decreases until the reflected intensity is below the preset threshold. This triggers cliff avoidance behavior. Highly reflective floor material delays the onset of cliff detection only slightly. By arranging the emitter and detector at 45° with respect to the floor, the region of overlap as a function of height is minimized. Equal incidence and reflection angles ensure that the cliff detector functions regardless of whether the floor material is specular or diffuse. The size of the overlap region can be selected by choosing the degree of collimation and the nominal distance to the floor.

Figure 10:
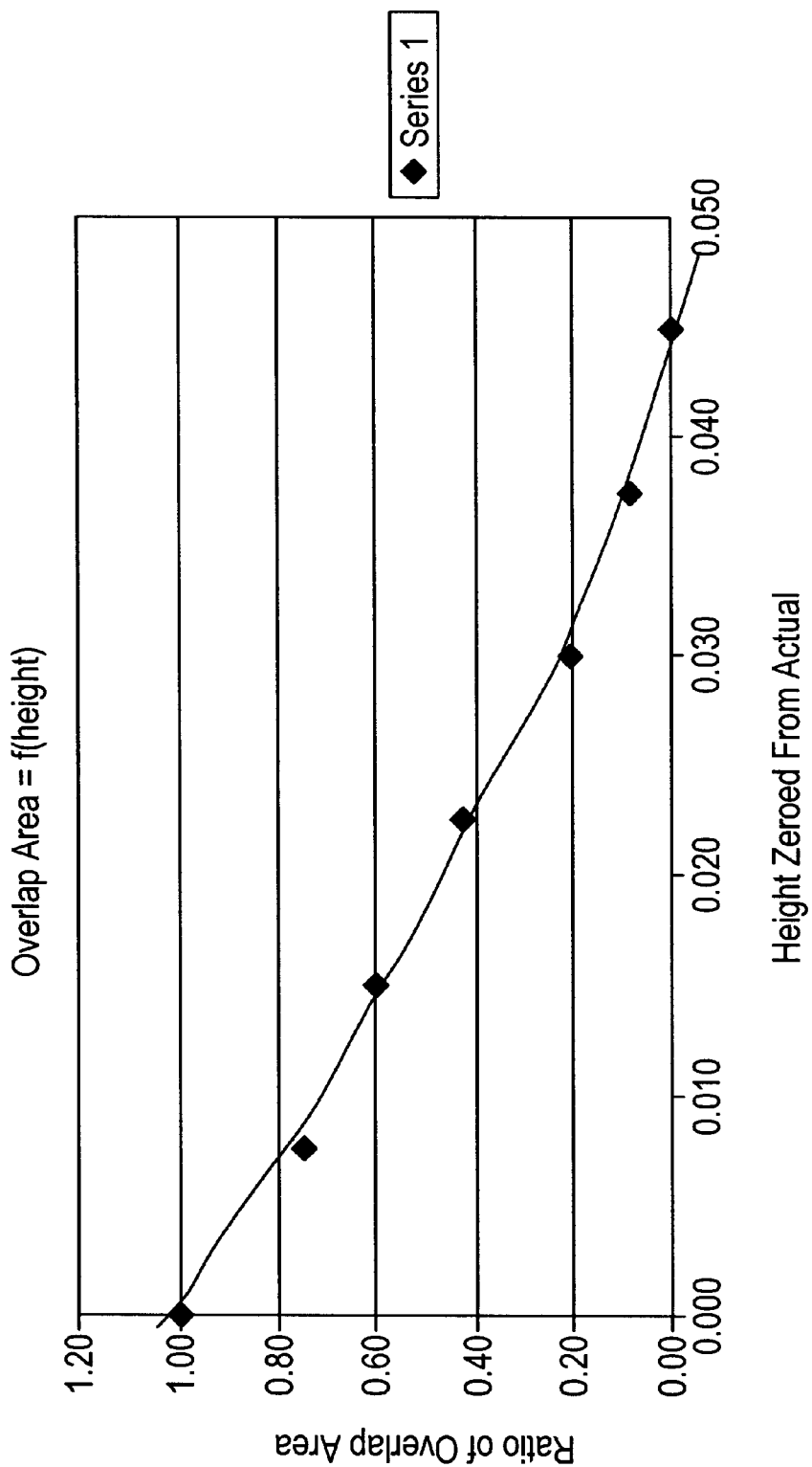
FIG. 10 is a graph showing the relationship between the ratio of overlap area and the height of the sensor subsystem above the floor.

In this way, the logic interface between the sensor subsystem and the control circuitry of the robot is greatly simplified. As shown in the table of FIG. 10, when the displaced height is zero, that is the height of the sensor above the floor is nominal (e.g., 0.058 inches), the ratio of the area of overlap of the field of view and the field of emission is set at one but decreases almost linearly until there is no overlap at a displaced height equal to the maximum height obstacle the robot can successfully traverse (in this example a displaced distance of 0.050 inches). Thus, the overlap area is a function of the height of the sensor subsystem from the surface.

By tuning the system to simply redirect the robot when there is no detectable overlap, i.e., when the detector fails to emit a signal, the logic interface required between the sensor subsystem and the control electronics (e.g., a microprocessor) is simple to design and requires no or little signal conditioning. The emitted IR beam may be modulated and the return beam filtered with a matching filter in order to provide robust operation in the presence of spurious signals, such as sunlight, IR-based remote control units, fluorescent lights, and the like. Conversely, for the wall sensor embodiment, the system is tuned to redirect the robot when there is a detectable overlap.

FIGS. 11–12 provide in graphical form an example of the differences in the area of overlap depending on the height (d) of the sensor subsystem from a surface. The field of emission of the emitter and the field of view of the detector were set to be equal and non-overlapping at a distance (d) of 1.3 inches and each was an ellipse 0.940 inches along the major diameter and 0.650 inches along minor diameter. A full overlap occurred at d=0.85 inches where the resulting overlapping ellipses converge into a single ellipse 0.426 inches along the minor diameter and 0.600 inches along the major diameter. Those skilled in the art will understand how to adjust the field of emission and the field of view and the intersection region between the two to meet the specific design criteria of any robotic device in question. Thus, FIGS. 11 and 12 provide illustrative examples only.

Figure 13:
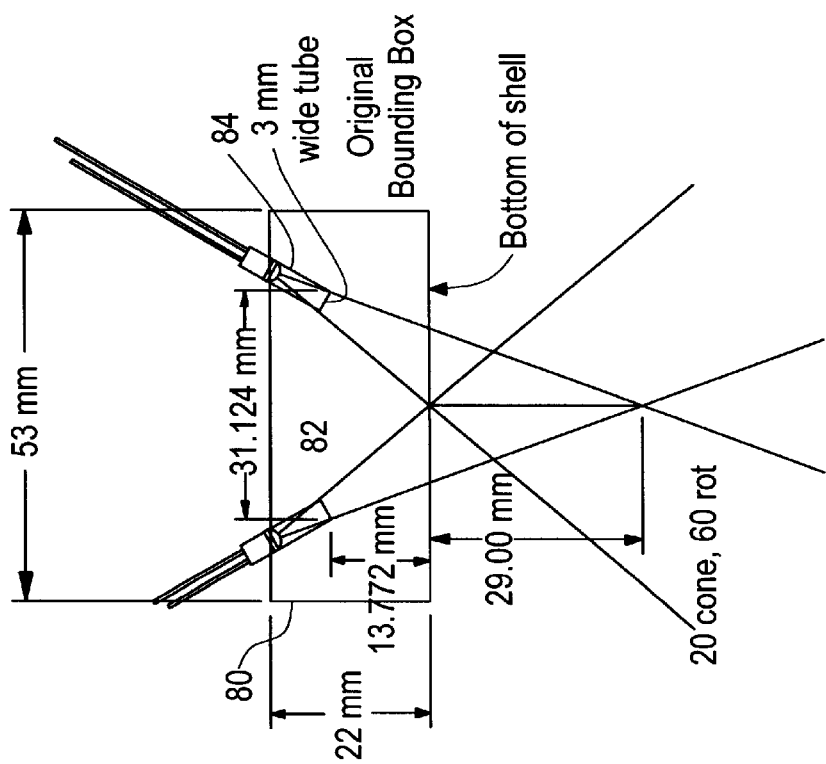
FIG. 13 is a more detailed schematic view of the sensor subsystem according to the preferred embodiment of the subject invention.

In one embodiment, as shown in FIG. 13, housing 80 of the sensor subsystem was rectangular 22 mm by 53 mm. 3 mm diameter plastic emitter collimator tube 82 and 3 mm diameter plastic detector collimator tube 84 were placed 13.772 mm from the bottom of housing 80 which was flush with the bottom of the shell of the robot. This configuration defined field of view and field of emission cones of 20° placed at a 60° angle from each other. The angle between the respective collimator tubes was 60° and they were spaced 31.24 mm apart.

This configuration defined a region of intersection between the field of emission and the field of view 29.00 mm long beginning at the bottom of the robot.

Figure 14:
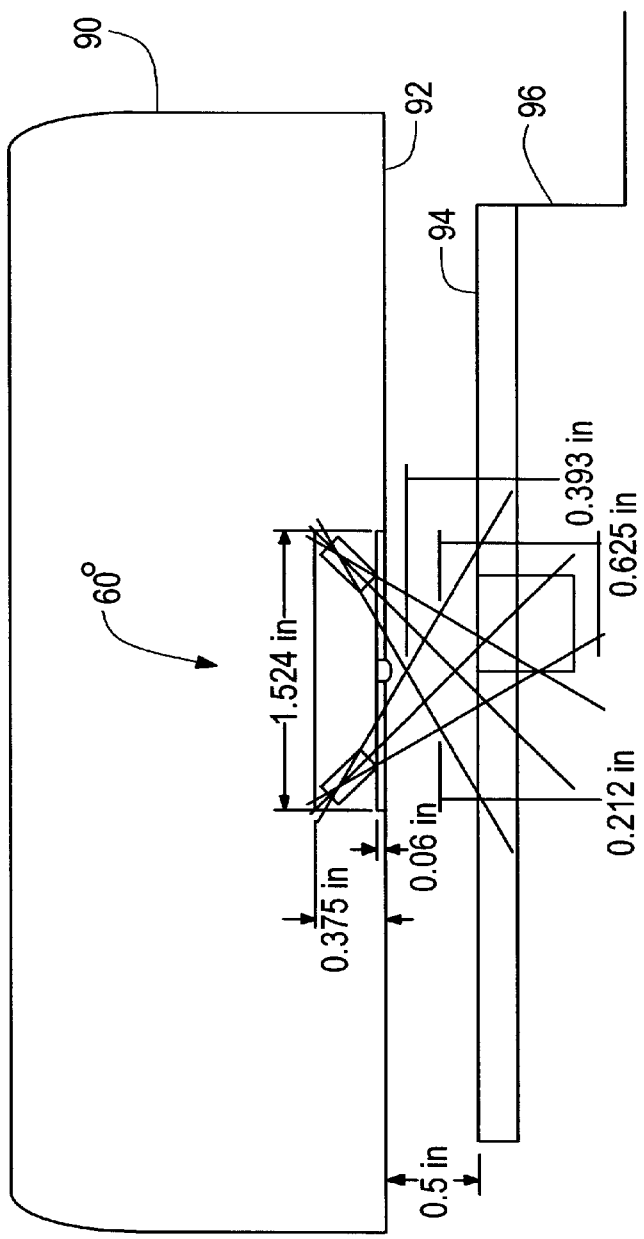
FIG. 14 is a schematic view of the sensor subsystem of FIG. 13 in place on the shell or housing of a robot in accordance with the subject invention.

In the design shown in FIG. 14, the sensor subsystem is shown integrated with robot shell or housing 90 with a wheel (not shown) which supports the bottom 92 of shell 90 one half an inch above surface or floor 94. The region of overlap of the field of view and the field of emission was 0.688 inches, 0.393 inches above. Thus, if stair 96 has a rise greater than 0.393 inches, no signal will be output by the detector and the robot redirected accordingly. In the preferred embodiment, the emitter includes an infrared light source and the detector includes an infrared photon detector each disposed in round plastic angled collimators.

Figure 15:
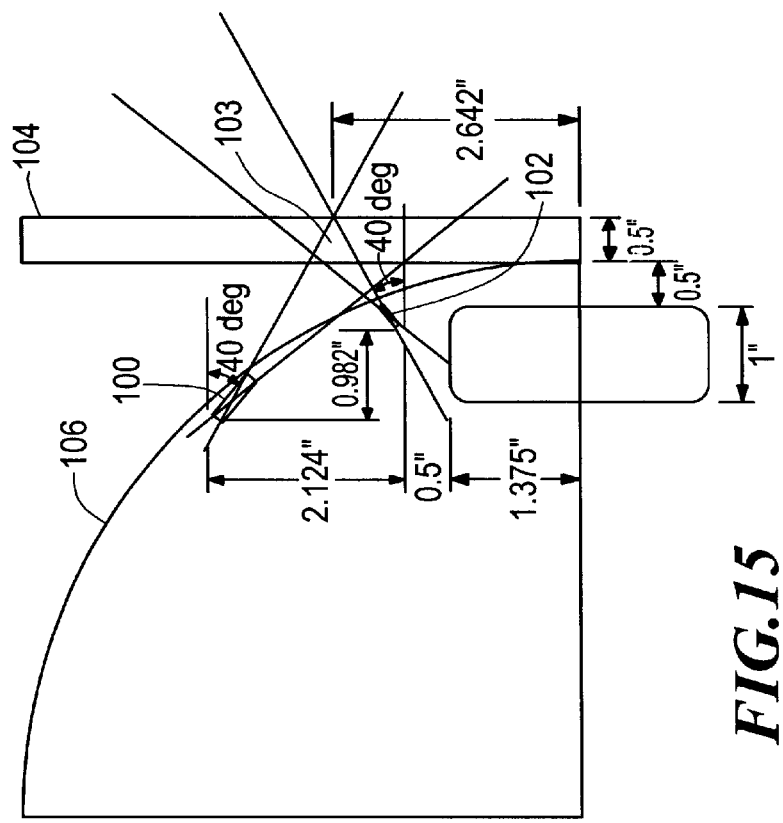
FIG. 15 is a schematic view of the wall detection system in accordance with the subject invention in place on the shell or housing of a robot.

For wall detection, emitter 102 and detector 100 are arranged as shown in FIG. 15. The optical axes of the emitter and detector are parallel to the floor on which the robot travels. The field of emission of the emitter and the field of view of the detector are both 22 degree cones. A three millimeter diameter tube produces a cone of this specification when the active element is mounted 0.604 inches from the open end as shown. The optical axes of the emitter and detector intersect at an angle of 80 degrees. The volume of intersection 103 occurs at a point about 2.6 inches ahead of the point of tangency between the robot shell 106 and the wall 104 when the robot is travelling parallel to the wall. The line bisecting the intersection of the optical axes of the emitter and detector is perpendicular to the wall. This ensures that reflections from specular walls are directed from the emitter into the detector.

Figure 16:
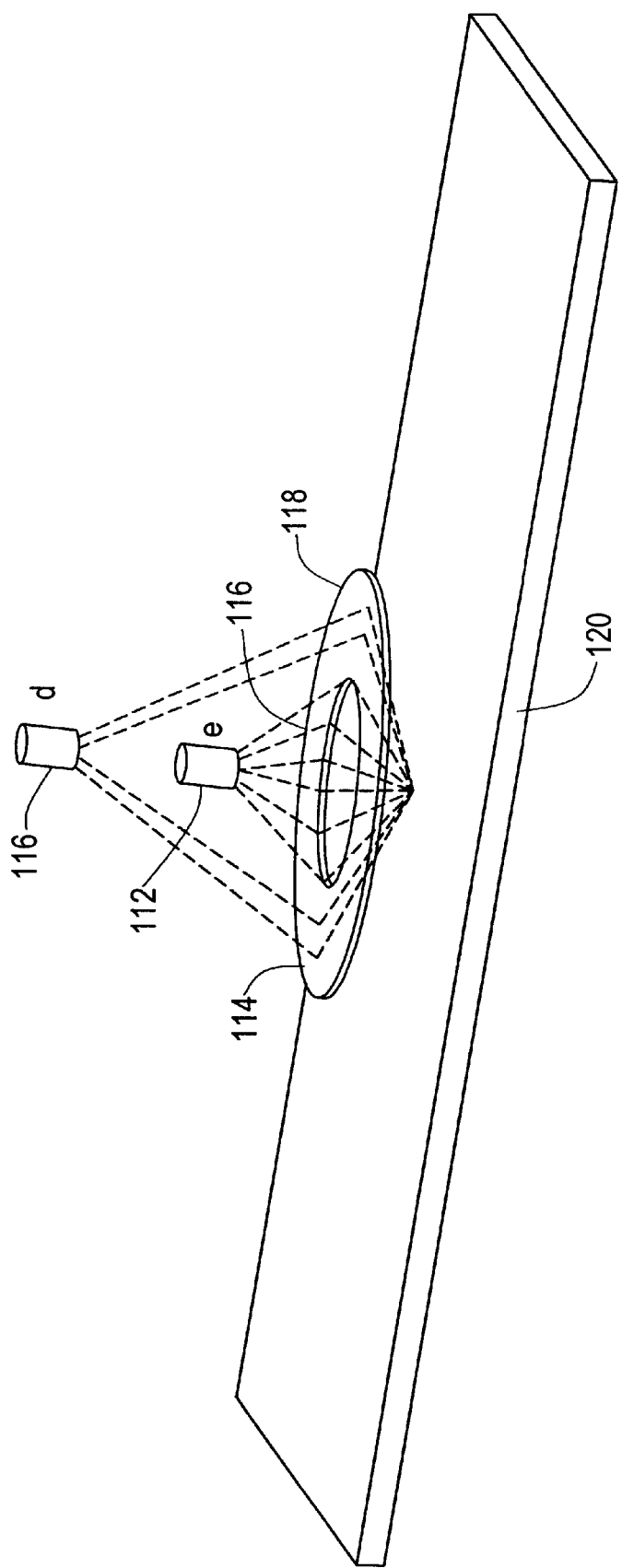
FIG. 16 is a schematic three dimensional view of another embodiment of the sensor system in accordance with the subject invention.

In another embodiment, detector 116, FIG. 16 is positioned above emitter 112 and lens 118 with two areas of different curvature 116 and 114 used to focus light from emitter 112 to the same spot as the field of view of detector 116 at only one height above surface 120 so that if the height changes, there is no or at least not a complete overlap between the field of view of detector 116 and emitter 112 as defined by curvature areas 116 and 114. In this situation, the rapid change of reflected intensity with height is provided by focusing two lenses on a single spot. When the floor is in the nominal position relative to the sensor subsystem, the emitter places all its energy on a small spot. The detector is focused on the same spot. As the floor falls away from the nominal position, light reflected into the detector (now doubly out of focus) decreases rapidly. By carefully selecting the lens-to-floor distance and the focal lengths of the two lenses, it is possible for the emitter and detector to be located at different points but have a common focus on the floor.

Figure 17:
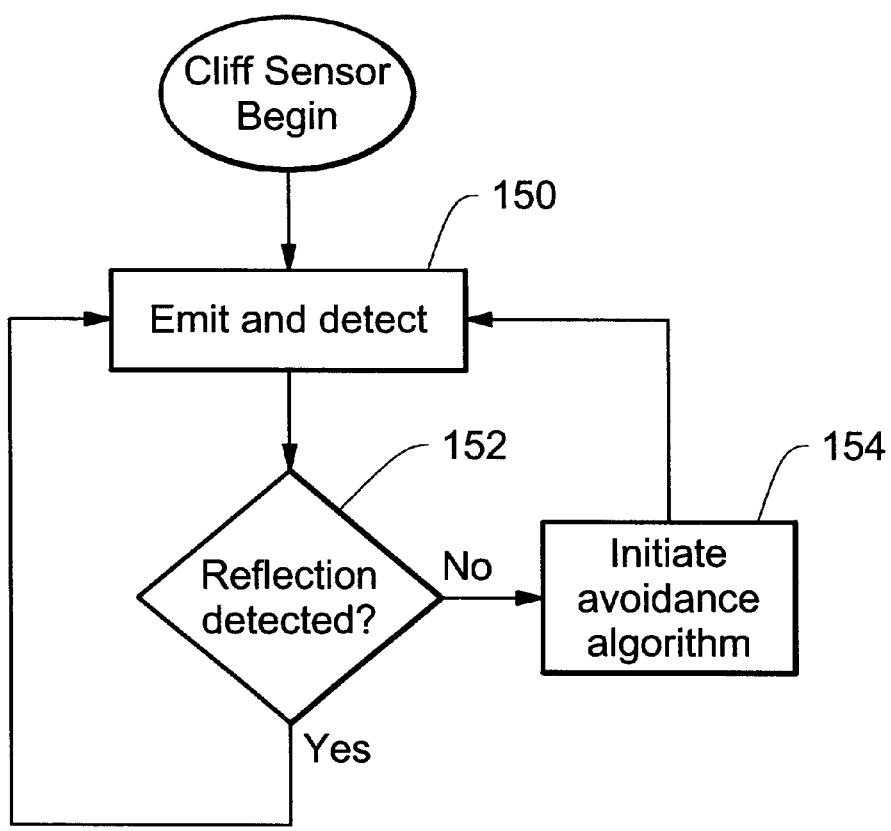
FIG. 17 is a flow chart depicting the primary steps associated with a logic which detects whether a cliff is present in front of the robot in accordance with the subject invention.

The logic of the circuitry associated with the cliff sensor embodiment modulates the emitter at a frequency of several kilohertz and detects any signal from the detector, step 150, FIG. 17, which is tuned to that frequency. When a signal is not output by the detector, step 152, the expected surface is not present and no overlap is detected. In response, an avoidance algorithm is initiated, step 17 to cause the robot to avoid any interfering obstacle. When a reflected signal is detected, processing continues to step 150.

Figure 18:
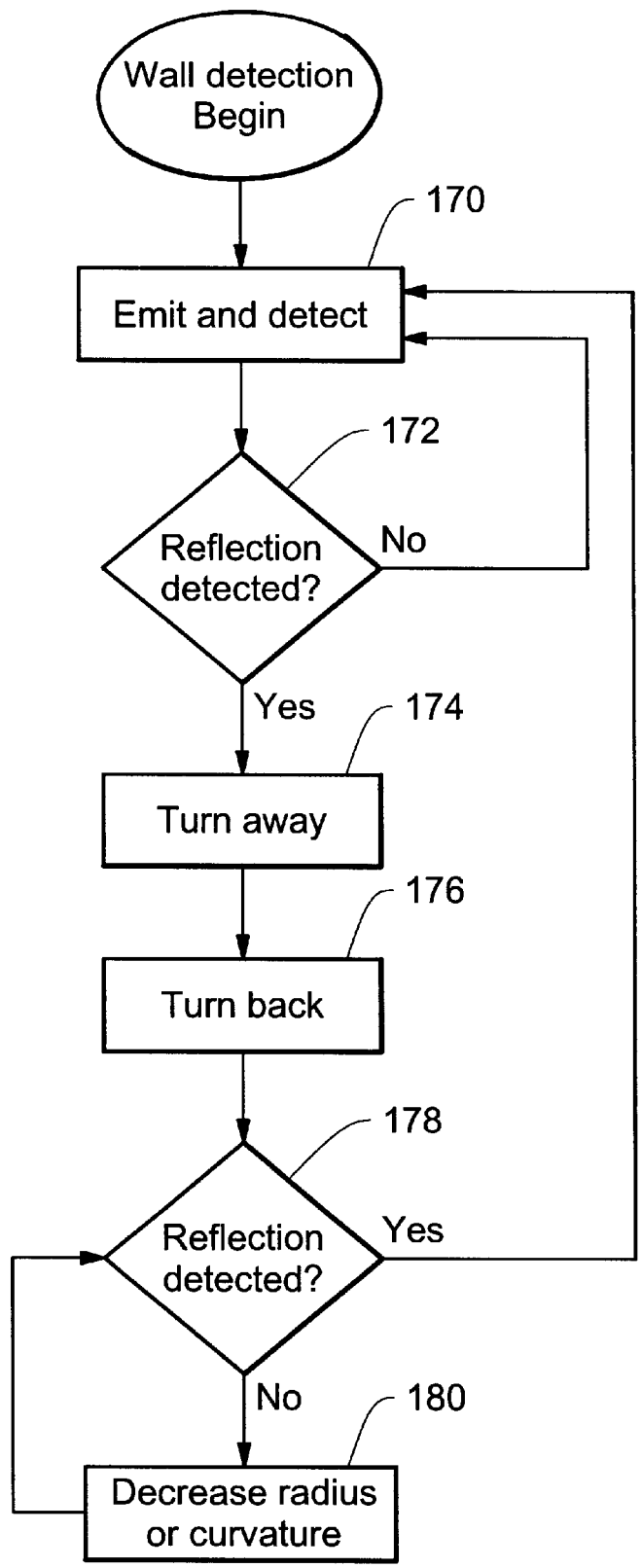
FIG. 18 is a flow chart depicting the primary steps associated with the logic of the wall detection mode of operation of the robot in accordance with the subject invention.

In the wall detection mode, the logic of the circuitry associated with the sensor subsystem modulates the emitter and detects signals from the detector as before, step 170, FIG. 18 until a reflection is detected, step 172. A wall is then next to the robot and the controlling circuitry causes the robot to turn away from the wall, step 174 and then turn back, step 176 until a reflection (the wall) is again detected, step 178. By continuously decreasing the radius of curvature of the robot, step 180, the path of the robot along the wall in the wall following mode is made smoother.

Figure 19:
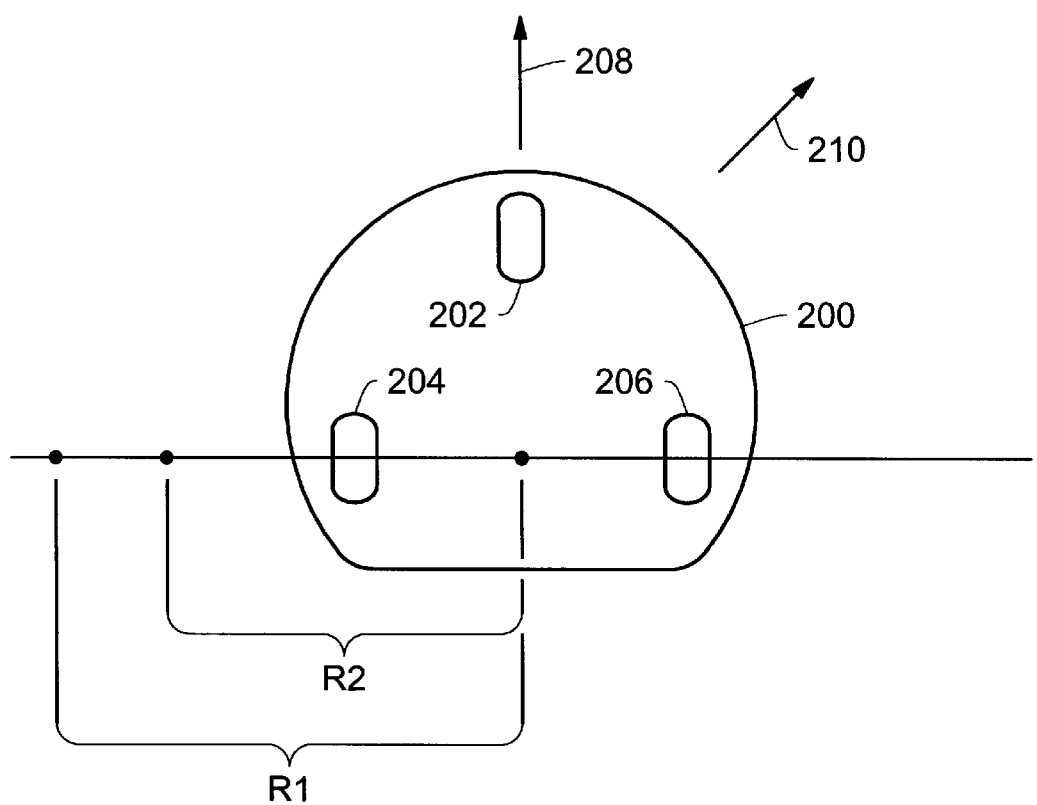
FIG. 19 is a bottom view of a cleaning robot in accordance with the subject invention configured to turn about curvatures of decreasing radiuses.

As shown in FIG. 19, robot housing 200 includes three wheels 202, 204, and 206 and is designed to only move forward in the direction shown by vector 208. When a wall is first detected (step 172, FIG. 18), the robot turns away from the wall in the direction of vector 210 and then turns back towards the wall rotating first about radius $R_1$ and then about radius $R_2$ and then about smoothly decreasing radius points (steps 178–180, FIG. 18) until the wall is again detected.

As shown in FIG. 20, if only one constant radius of curvature was chosen, the robot's travel path along the wall would be a series of abrupt motions. In contrast, by continuously reducing the radius of curvature as the robot moves forward back to the wall in accordance with the subject invention, the robot's travel path along the wall is smooth as shown in FIG. 21.

For reasons of cleaning thoroughness and navigation, the ability to follow walls is essential for cleaning robots. Dust and dirt tend to accumulate at room edges. The robot therefore follows walls that it encounters to insure that this special area is well cleaned. Also, the ability to follow walls enables a navigation strategy that promotes full coverage. Using this strategy, the robot can avoid becoming trapped in small areas. Such entrapments could otherwise cause the robot to neglect other, possibly larger, areas.

But, it is important that the detected distance of the robot from the wall does not vary according to the reflectivity of the wall. Proper cleaning would not occur if the robot positioned itself very close to a dark wall but several inches away from a light colored wall. By using the dual collimation system of the subject invention, the field of view of the infrared emitter and detector are restricted in such a way that there is a limited, selectable volume where the cones of visibility intersect. Geometrically, the sensor is arranged so that it can detect both diffuse and specular reflection. This arrangement allows the designer to select with precision the distance at which the robot follows the wall independent of the reflectivity of the wall.

Figure 22:
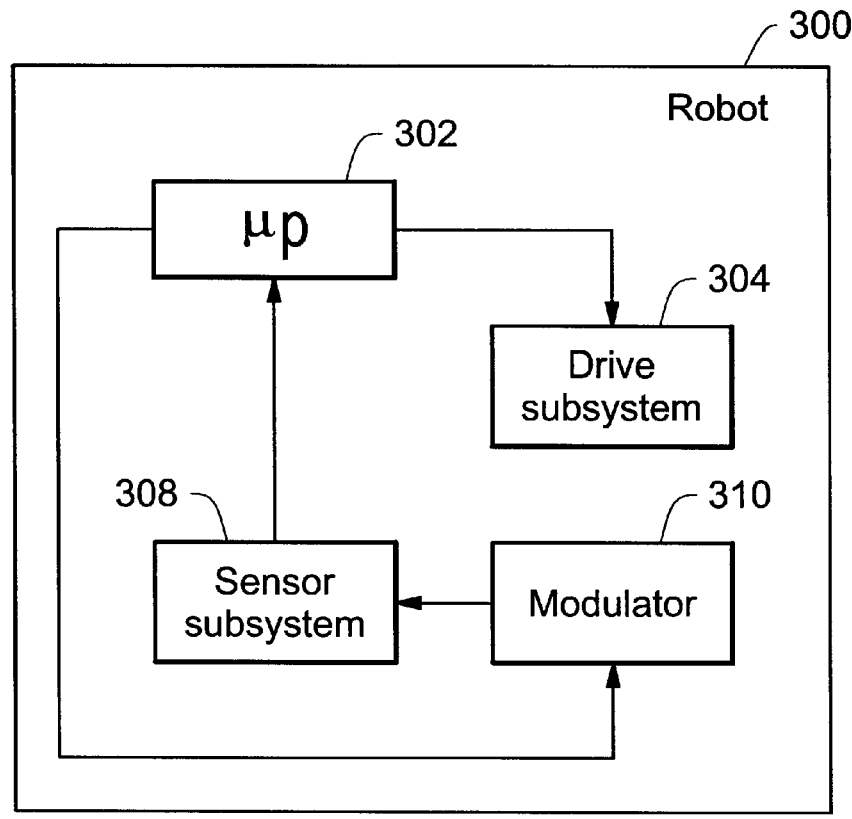
FIG. 22 is a block diagram showing the primary components associated with a complete robotic cleaning device.

A more complete robot system 300, FIG. 22 in accordance with this invention includes a circuit embodied in microprocessor 302 which controls drive motion subsystem 304 of robot 300 in both the random movement and wall following modes to drive and turn the robot accordingly. Sensor subsystem 308 represents the designs discussed above with respect to FIGS. 6–16. The detectors of each such subsystem provide an output signal to microprocessor 302 as discussed supra which is programmed according to the logic discussed with reference to FIGS. 17–18 to provide the appropriate signals to drive subsystem 304. Modulator circuitry 310 drives the emitters of the sensor subsystem 308 under the control of processor 302 as discussed above.

Figure 23:
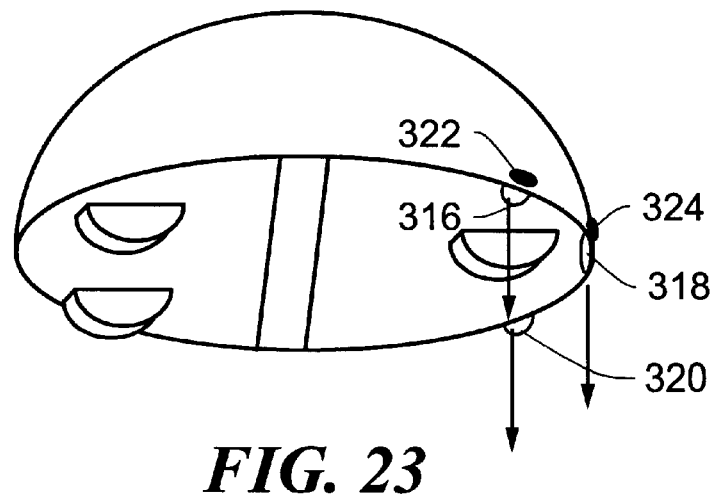
FIG. 23 is a schematic three dimensional view of a robotic cleaning device employing a number of cliff sensors and wall sensors in accordance with the subject invention.

Typically, there are three or more cliff detector subsystems as shown in FIG. 23 at locations 316, 318, and 320 spaced about the forward bottom portion of the robot and aimed downward and only one or two or more wall detector subsystems at locations 322 and 324 spaced about the forward portion of the robot housing and aimed outwardly.

Figure 24:
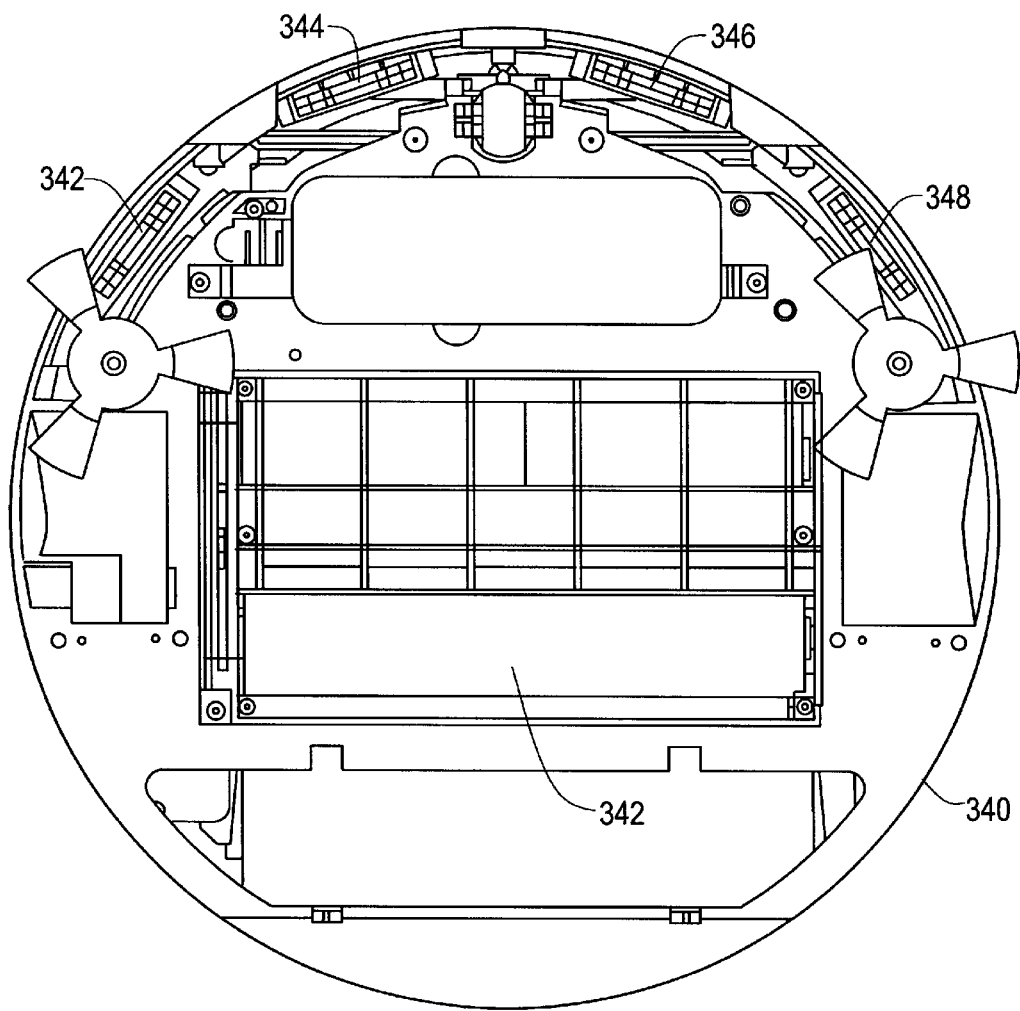
FIG. 24 is a bottom view of one particular robotic cleaning device and the cliff sensors incorporated therewith in accordance to the subject invention.
Figure 25:
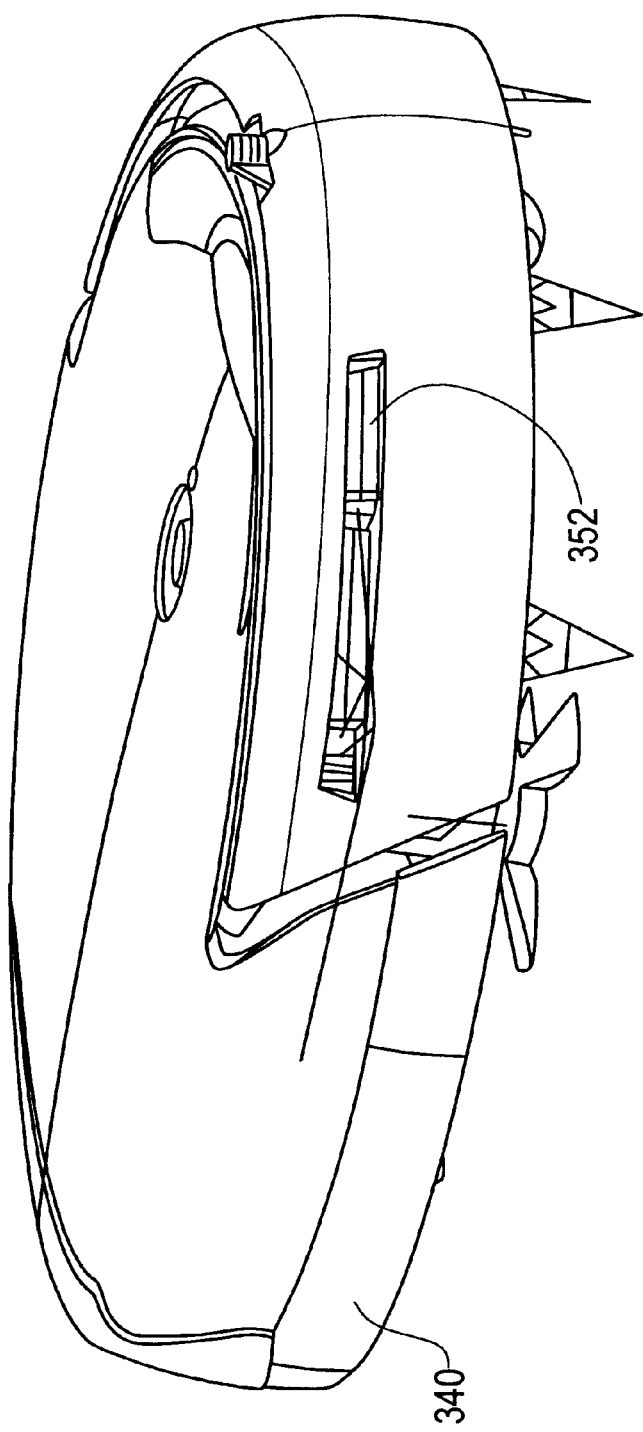
FIG. 25 is a side view of the same robot further incorporating wall following sensors in accordance with the subject invention.

In one embodiment, 12 inch diameter three wheeled differentially steered robot 340, FIG. 24 is a sweeper type cleaning robot equipped with sweeping brush 342 and includes four cliff detector subsystems 342, 344, 346, and 348 and one wall detector subsystem 352, FIG. 25. The output of the detectors of each subsystem are typically connected together by "OR" circuitry logic so that when any one detector detects a signal it is communicated to the processor.

Figure 26:
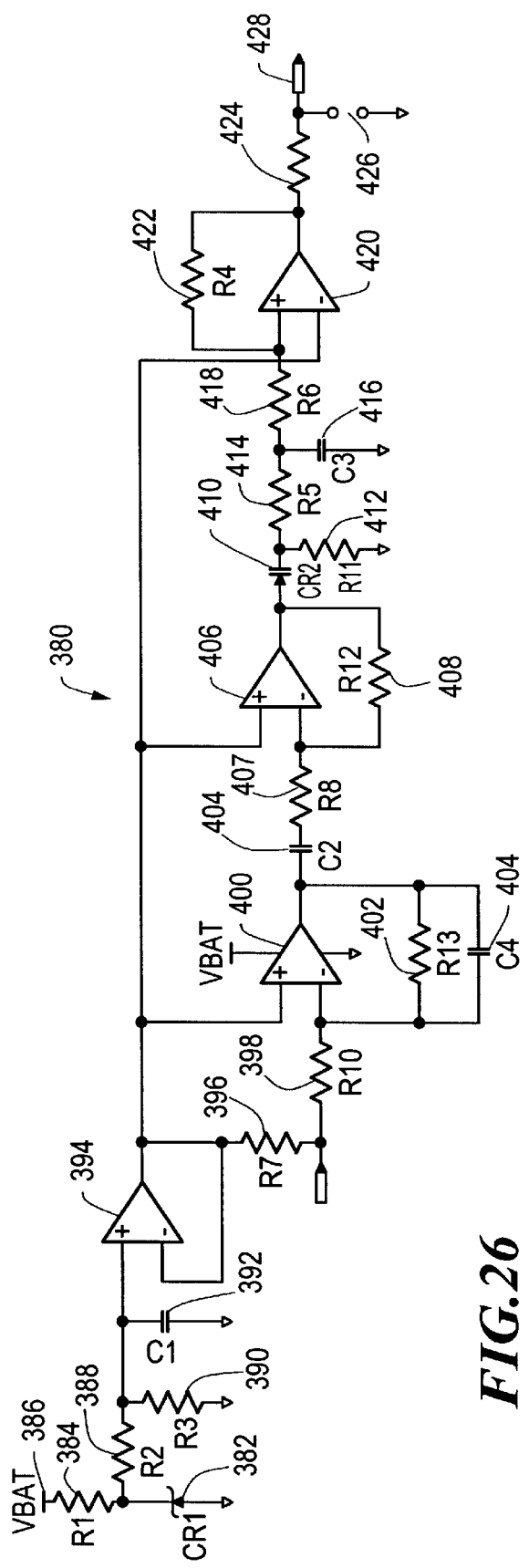
FIG. 26 is a circuit diagram for the detector circuit of the subject invention.

FIG. 26 shows one embodiment of a detector circuit. R1 (384), CR1 (382), R2 (388), R3 (390), C1 (392), and U1:D (394) form a voltage reference used to prevent saturation of intermediate gain stages. In this embodiment, R1 (384) and CR1 (382) create from the input voltage (386) approximately 5.1V that is divided by voltage divider R2 (388), R3 (390) to create a voltage of approximately 1.8V. This is buffered by U1:D (394) configured as a unity gain follower. C1 (392) is provided to reduce noise. The photo-transistor (not shown) used in this embodiment requires a biasing current, provided from the above described reference voltage through R7 (396). R10 (398), R13 (402), and U1:A (400) implement an amplifier with a gain of approximately −10. C4 (404) is provided for compensation and to reduce noise.

C2 (404) is used to block any DC component of the signal, while R8 (407), R12 (408), and U1:B (406) implement an amplifier with a gain of approximately −100. CR2 (410), R5 (414), and C3 (416) implement a peak detector/rectifier. R11 (412) provides a discharge path for C3 (416). The output of this peak detector is then compared to the above mentioned reference voltage by U1:C (420). R4 (422) provide hystersis. R9 (424) is a current limiting resistor used so that the output of U1:C (420) may be used to drive an indicator LED (not shown). Jumper JU1 (426) provides a convenient test point for debugging.

Figure 27:
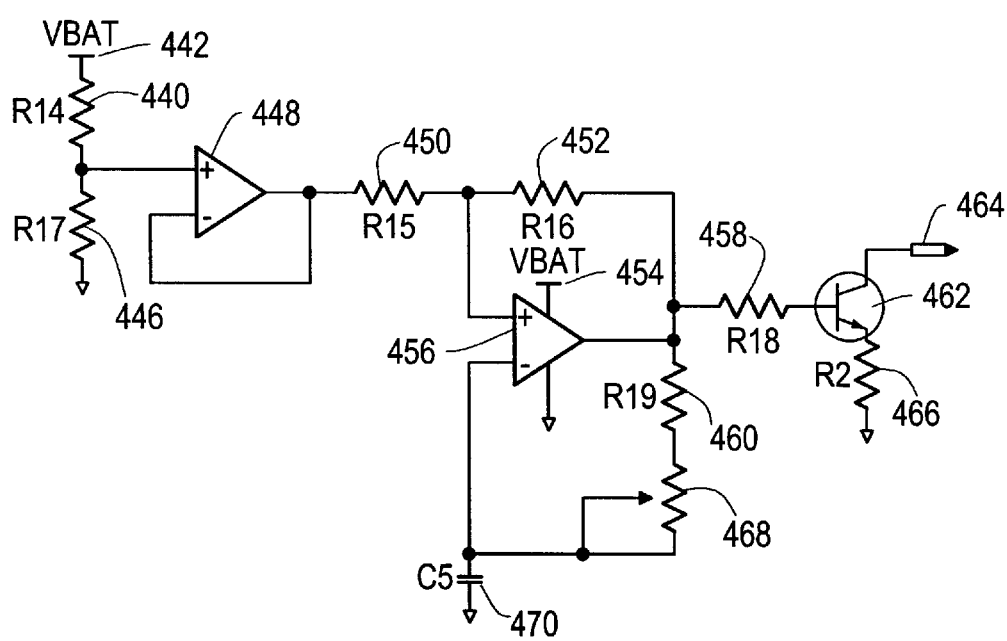
FIG. 27 is a circuit diagram for the oscillator circuit of the subject invention.

An oscillator circuit as shown in FIG. 27 is used to modulate the emitter IR LED at a frequency of several KHz. The exact frequency may be selected by adjusting R23 (468). Those skilled in the art will immediately deduce other ways of obtaining the same function. The simple filter/amplifier circuit of FIG. 26 is used to receive and amplify the output of a photo-transistor (not shown). A peak detector/integrator is used to convert the AC input to a threshold measurement. If sufficient energy in the selected bandwidth is received, the output signal is present at (428) is driven to a logical high state. Those skilled in the art will immediately recognize other ways of achieving the same ends. Components R14 (440), R17 (446), and U2:B (448) create a buffered bias voltage equal to approximately one-half of the input voltage (442). U2:A (456), R19 (460), R23 (468), and C5 (470) create a simple oscillator of a form commonly used. R18 (458), Q1 (462), and R21 (466) convert the voltage mode oscillations of the oscillator described to current-mode oscillations in order that the emitter LED (connected to 464) be relatively constant current regardless of power supply voltage (442). The actual current impressed through the circuit may be altered to meet the requirements of the chosen LED by varying the value of R21 (466).

Figure 28:
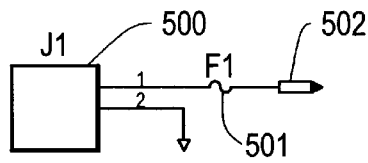
FIG. 28 is a circuit diagram for the power connection circuit of the subject invention.
Figure 29:
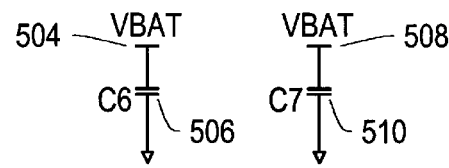
FIG. 29 is the decoupling circuit of the subject invention.
Figure 30:
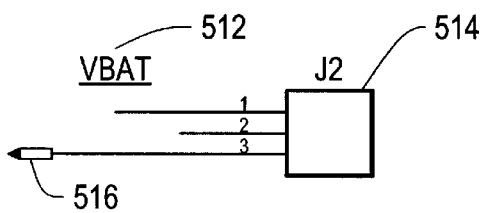
FIG. 30 is a diagram of a connector used in the subject invention.
Figure 31:
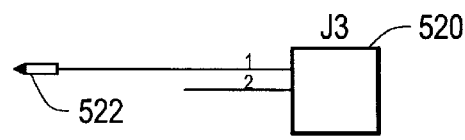
FIG. 31 is a diagram of another connector.
Figure 32:
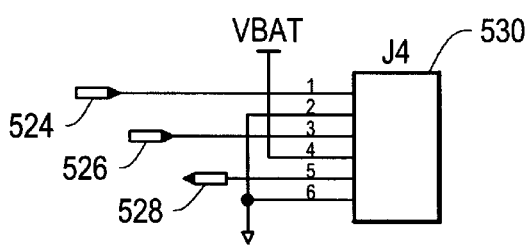
FIG. 32 is a diagram of still another connector.
Figure 33:
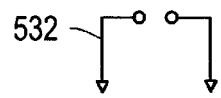
FIG. 33 is a circuit diagram of a jumper used in the subject invention.
Figure 34:
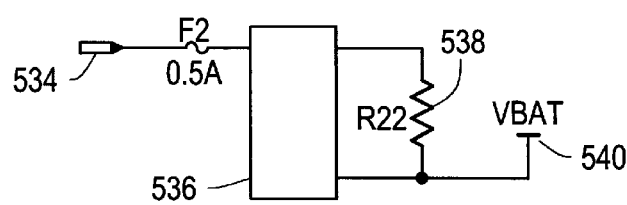
FIG. 34 is a circuit diagram for constant current source used in the subject invention.

In FIG. 28, a connector J1 (500) is used to connect the system to a means of supplying power (e.g., a battery). Fuse F1 (501) is included to limit excessive current flow in the event of a short circuit or other defect. Capacitors C6 (506) and C7 (510), FIG. 29 are provided for decoupling of other electronics (U1 and U2). Connector J2 (514), FIG. 30 provides a means of attachment for the IR LED transmitter (not shown). Connector J3 (520), FIG. 31 provides a means of attachment for the IR photo-transistor (not shown). Connector J4 (530), FIG. 32 provides a means of attachment for an indicator LED (to indicate the presence or absence of an obstacle, a means of attachment for a battery (not shown), and a means of attachment for a recharging power supply (not shown). Jumper JU2, FIG. 33, provides a convenient GROUND point for test equipment, etc. U3 (536) and R22 (538), FIG. 34 implements a constant-current source used in recharging an attached NiCad battery. U3 maintains a constant 5 volts between pins 3 and 2.5 volts divided by 22 Ohms (R22) creates a current of approximately 230 mA.

In other embodiments, a fiber optic source and detector may be used which operate similar to the sensor subsystems described above. The difference is that collimation is provided by the acceptance angle of two fiber optic cables. The fiber arrangement allows the emitter and detector to be located on a circuit board rather than mounted near the wheel of the robot. The cliff detector and wall detector can also be implemented using a laser as the source of the beam. The laser provides a very small spot size and may be useful in certain application where the overall expense is not a priority design consideration. Infrared systems are preferred when cost is a primary design constraint. Infrared sensors can be designed to work well with all floor types, they are inexpensive, and can be fitted into constrained spaces.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A robot obstacle detection system comprising:
   a robot housing which navigates with respect to a surface;
   a sensor subsystem having a defined relationship with respect to the housing and aimed at the surface for detecting the surface, the sensor subsystem including:
      an optical emitter which emits a directed beam having a defined field of emission, and
      a photon detector having a defined field of view which intersects the field of emission of the emitter at a finite region; and
   a circuit in communication with the detector for redirecting the robot when the surface does not occupy the region to avoid obstacles.

2. The system of claim 1 further including a plurality of sensor subsystems spaced from each other on the housing of the robot, the circuit including logic for detecting whether any detector of each said sensor subsystem has failed to detect a beam from an emitter.

3. The system of claim 1 in which the robot includes a surface cleaning brush.

4. The system of claim 1 in which the emitter includes an infrared light source and the detector includes an infrared photon detector.

5. The system of claim 4 further including a modulator connected to the infrared light source for modulating the directed infrared light source beam at a predetermined frequency.

6. The system of claim 5 in which the infrared photon detector is tuned to the said predetermined frequency.

7. The system of claim 4 in which the emitter further includes an emitter collimator about the infrared light source for directing the beam and in which the detector further includes a detector collimator about the infrared photon detector to define the field of view.

8. The system of claim 7 in which the emitter collimator and the detector collimator are angled with respect to the surface to define a finite region of intersection.

9. A robot wall detection system comprising:

a robot housing which navigates with respect to a wall;

a sensor subsystem having a defined relationship with respect to the housing and aimed at the wall for detecting the presence of the wall, the sensor subsystem including:
  an emitter which emits a directed beam having a defined field of emission, and
  a detector having a defined field of view which intersects the field of emission of the emitter at a region; and a circuit in communication with the detector for redirecting the robot when the wall occupies the region.

10. The system of claim 9 further including a plurality of sensor subsystems spaced from each other on the housing of the robot, the circuit including logic for detecting whether any detector of any said sensor subsystem has detected a beam from an emitter.

11. The system of claim 9 in which the robot includes a surface cleaning brush.

12. The system of claim 9 in which the emitter includes an infrared light source and the detector includes an infrared photon detector.

13. The system of claim 12 further including a modulator connected to the infrared light source for modulating the directed infrared light beam at a predetermined frequency.

14. The system of claim 13 in which the infrared photon detector is tuned to the predetermined frequency.

15. The system of claim 12 in which the emitter farther includes an emitter collimator about the infrared light source for directing the beam and in which the detector further includes a detector collimator about the infrared photon detector to define the field of view.

16. The system of claim 15 in which the emitter collimator and the detector collimator are angled with respect to surface.

17. The system of claim 9 in which the circuit includes logic which redirects the robot away from the wall when the wall occupies the region and back towards the wall when the wall no longer occupies the region of intersection.

18. The system of claim 9 in which the circuit includes logic which redirects the robot away from the wall when the wall occupies the region and then back towards the wall when the wall no longer occupies the region of intersection at decreasing radiuses of curvature until the wall once again occupies the region of intersection.

19. An autonomous robot comprising:

a housing which navigates in at least one direction on a surface;

a first sensor subsystem aimed at the surface for detecting obstacles on the surface; and a second sensor subsystem aimed at least proximate the direction of navigation for detecting walls, each said subsystem including:
  an optical emitter which emits a directed beam having a defined field of emission and a photon detector having a defined field of view which intersects the field of emission of the emitter at a finite, predetermined region.

20. A sensor subsystem for an autonomous robot which rides on a surface, the sensor subsystem comprising:

an optical emitter which emits a directed optical beam having a defined field of emission;

a photon detector having a defined field of view which intersects the field of emission of the emitter at a region; and a circuit in communication with the detector for providing an output when a wall is not present in the region, wherein the output from the circuit causes the robot to be directed back towards the wall when the wall does not occupy the region of intersection of the defined field of emission of the emitter and the defined field of view of the detector.

* * * * *